(12) United States Patent
Toya

(10) Patent No.: US 10,306,276 B2
(45) Date of Patent: May 28, 2019

(54) INFORMATION DEVICE

(71) Applicant: FUNAI ELECTRIC CO., LTD., Osaka (JP)

(72) Inventor: Takehiro Toya, Daito (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 15/675,794

(22) Filed: Aug. 14, 2017

(65) Prior Publication Data
US 2018/0077435 A1    Mar. 15, 2018

(30) Foreign Application Priority Data

Sep. 12, 2016   (JP) .................................. 2016-177872
Feb. 27, 2017   (JP) .................................. 2017-034363

(51) Int. Cl.
| | |
|---|---|
| H04N 7/173 | (2011.01) |
| H04N 21/2343 | (2011.01) |
| H04N 21/222 | (2011.01) |
| H04N 21/262 | (2011.01) |
| H04N 21/643 | (2011.01) |
| H04N 21/845 | (2011.01) |

(52) U.S. Cl.
CPC ..... *H04N 21/2343* (2013.01); *H04N 21/2223* (2013.01); *H04N 21/26258* (2013.01); *H04N 21/64322* (2013.01); *H04N 21/8456* (2013.01)

(58) Field of Classification Search
CPC combination set(s) only.
See application file for complete search history.

(56) References Cited

U.S. PATENT DOCUMENTS

| | | | |
|---|---|---|---|
| 2013/0067052 A1* | 3/2013 | Reynolds ................ | H04L 67/02 709/223 |
| 2014/0023341 A1* | 1/2014 | Wang ....................... | H04N 9/87 386/240 |
| 2014/0281481 A1* | 9/2014 | Moroney ............ | H04L 63/0457 713/151 |
| 2018/0130166 A1* | 5/2018 | Kumakura ............ | G06T 1/0007 |

FOREIGN PATENT DOCUMENTS

| | | |
|---|---|---|
| JP | 2003-288290 | 10/2003 |
| WO | 2016110324 | 7/2016 |

\* cited by examiner

*Primary Examiner* — Mulugeta Mengesha
(74) *Attorney, Agent, or Firm* — JCIPRNET

(57) ABSTRACT

An information device is provided, including a communication part, communicating with an external device; and a controller, downloading video data from the external device via the communication part and executing an application. The application creates distribution data having the same format as the video data from the video data and reproduction list data, and to reproduce the distribution data. A local server in the application transmits the distribution data and the reproduction list data to a reproduction part. The controller puts transmission of the reproduction list data from the local server to the reproduction part on standby until the reproduction list data is updated based on the distribution data, or adding reproduction-continuation video data to update the reproduction list data until the reproduction list data is updated based on the distribution data.

17 Claims, 12 Drawing Sheets

INFORMATION DEVICE

CROSS-REFERENCE TO RELATED APPLICATION

This application claims the priority benefits of Japan application serial no. 2016-177872, filed on Sep. 12, 2016 and Japan application serial no. 2017-034363, filed on Feb. 27, 2017. The entirety of each of the above-mentioned patent applications is hereby incorporated by reference herein and made a part of this specification.

BACKGROUND OF THE INVENTION

Field of the Invention

The present invention relates to an information device and more particularly to an information device including a communication part.

Description of Related Art

An information device having a communication part is conventionally known, for example, see Patent Document 1 (Japanese Unexamined Patent Application, First Publication No. 2003-288290).

In the above-described Patent Document 1, the information device having the communication part that communicates with a content distribution server which distributes data such as stream content is disclosed. This information device is to download data such as stream content from the content distribution server.

SUMMARY OF THE INVENTION

However, in the information device disclosed in the above Patent Document 1, there is a problem in that reproduction software of the information device cannot reproduce video data if video data of a transport stream format is not converted into a predetermined format such as an mp4 format when video data of a stream of television broadcasting waves (a transport stream format) has been downloaded via the communication part.

The present disclosure solves the above problem and provides an information device capable of reproducing downloaded video data according to a transport stream format without converting the downloaded video data into another format.

In view of above, an information device according to an aspect of the present disclosure includes a communication part, communicating with an external device; and a controller, performing control for downloading video data from the external device via the communication part and performing control for executing an application. The application is to create distribution data having the same format as the video data from the video data and reproduction list data, and to reproduce the distribution data. The controller forms a local server in the application for transmitting the distribution data and the reproduction list data to a reproduction part, and performs control for putting a transmission of the reproduction list data from the local server to the reproduction part on standby until the reproduction list data is updated based on the distribution data, or performs control for adding reproduction-continuation video data separate from the distribution data to update the reproduction list data until the reproduction list data is updated based on the distribution data.

In the information device according to the aspect of the present disclosure, as described above, the controller that performs control for downloading video data from the external device via the communication part capable of communicating with the external device and performs control for executing an application for creating distribution data having the same format (the transport stream format or the like) as video data from the downloaded video data is provided, and the local server, which transmits distribution data to the reproduction part, is configured within the application by the controller. Thereby, because the distribution data having the same format as video data having the transport stream format downloaded by the communication part is created from the video data so that transmission (streaming) of a video is performed from the local server on the application in a pseudo manner, the information device can perform streaming reproduction without converting the downloaded video data according to the transport stream format into another format. Also, because the conversion of the video data is unnecessary, a user can save time and labor of performing an operation of conversion of the video data. Also, if the download of the video data and the reproduction of the video are simultaneously performed, the conversion of the video data is not performed, and thus it is not necessary to simultaneously perform the conversion of the video data and the reproduction of the video. Thereby, it is possible to reduce a load applied to the controller. Also, because the video data of the transport stream format can be reproduced in the same format as the transport stream format by executing the application, it is possible to reproduce video data of the transport stream format by merely installing the application in an information device capable of downloading the video data of the transport stream format. As a result, it is possible to easily reproduce video data downloaded in the transport stream format in various information devices.

Also, the controller is configured to create distribution data having the same format as downloaded video data from the downloaded video data and the reproduction list data for reproducing the distribution data and execute an application for controlling the reproduction of the distribution data, the local server is configured to transmit the reproduction list data to the reproduction part, and the controller is configured to perform control for putting transmission of the reproduction list data from the local server to the reproduction part on standby (stopping) until the reproduction list data is updated based on the distribution data. Thereby, even when the reproduction part of the information device is configured to stop the reproduction of a video based on that information indicating that the reproduction list data is not updated is transmitted from the local server to the reproduction part a plurality of times in a state in which the reproduction list data is not updated (even when the reproduction part is configured to stop the reproduction of the video based on that a predetermined state in which the reproduction list data is not updated continues), it is possible to prevent the reproduction of the video from being terminated by putting the transmission of the reproduction list data from the local server of the application to the reproduction part on standby (stopping, no transmission) in a state in which the reproduction list data is not updated. Also, the controller is configured to perform control for adding the reproduction-continuation video data separate from the distribution data to the reproduction list data so as to update the reproduction list data by until the reproduction list data is updated based on the distribution data. Thereby, even when the reproduction list data is not updated based on the distribution data due to an unstable communication state or the like, it is possible to continue reproduction of another video by updating list data based on the reproduction-continuation video data. Thus, because the reproduction of the video based on the same format (a reproduction format based on the list data) is continued, it is possible to prevent the reproduction of the video from being terminated (a state in which reproduction cannot be continued from the same position).

In the information device according to the aspect of the present disclosure, preferably, a list request signal for requesting the transmission of the reproduction list data is repeatedly transmitted from the reproduction part to the local server at a first time interval, and the controller performs control for putting the transmission of the reproduction list data from the local server to the reproduction part on standby even when the local server receives the list request signal from the reproduction part. According to this configuration, it is possible to more reliably prevent the reproduction of the video from being terminated because the reproduction list data that is updated is not transmitted from the local server to the reproduction part even when the list request signal is received.

In this case, preferably, if download of the video data is stopped, the controller performs control for putting the transmission of the reproduction list data from the local server to the reproduction part on standby when the local server receives the list request signal from the reproduction part. According to this configuration, it is possible to prevent the reproduction of the video from being terminated even when the user temporarily stops the reproduction of the video or the communication state is temporarily bad.

In the configuration in which the transmission of the reproduction list data from the local server is on standby (stopped) even when the controller receives the list request signal, preferably, the controller performs control for transmitting the reproduction list data from the local server to the reproduction part based on the that the reproduction list data is updated after the stop of the download of the video data is released. According to this configuration, if a state in which the user temporarily stops the reproduction of the video or a state in which the communication state is temporarily bad is released and normal download is resumed, the reproduction part can reliably receive the updated reproduction list data.

In the configuration in which the controller transmits the reproduction list data based on that the reproduction list data is updated, preferably, when the reproduction part receives the updated reproduction list data, a distribution request signal for requesting the transmission of the distribution data is transmitted from the reproduction part to the local server based on the updated reproduction list data, and the controller performs control for transmitting the distribution data from the local server to the reproduction part when the distribution request signal is received. According to this configuration, it is possible to resume reproduction of a video without terminating the reproduction of the video because the distribution data is transmitted (pseudo-distributed) from the local server to the reproduction part by transmitting the distribution request signal from the reproduction part to the local server after the reproduction part receives the updated distribution list data.

In the information device according to the above aspect, preferably, the controller periodically creates the distribution data and updates the reproduction list data at a second time interval. According to this configuration, it is possible to disperse the load applied to the controller at the time of creating the distribution data and updating the reproduction list data because the creation of the distribution data and the update of the reproduction list data are performed periodically.

In this case, preferably, the distribution data is divided into two or more in correspondence with a predetermined reproduction time in the application, and the second time interval is the same as the reproduction time.

In the information device according to the above aspect, preferably, the local server in the application can comprise a first local server, transmitting the distribution data and the reproduction list data to the reproduction part; and a second local server, transmitting the video data to the dividing part. In addition, the application can comprises a dividing part, and the dividing part divides the downloaded video data into two or more within the application to generate the distribution data. According to this configuration, because two local servers are configured within the application, it is possible to reduce a load applied to the local servers by dispersing the load to the two local servers more than when one local server is configured. Thus, it is possible to prevent the application from being stopped and prevent reproduction of a video from being stopped due to a load applied to the local server.

In this case, preferably, the local server further comprises a third local server, transmitting the distribution data and the reproduction list data to the reproduction part. According to this configuration, when a plurality of videos is simultaneously viewed, it is possible to reduce the load applied to the local server that transmits data to the reproduction part more than when one local server transmits (pseudo-distributes) the distribution data and the reproduction list data to the reproduction part. Thus, it is possible to prevent the application from being stopped and prevent the reproduction of the video from being stopped due to a load applied to the local server. Also, it is possible to continue reproduction of another video even when reproduction of one video is stopped.

In the information device according to the above aspect, preferably, the controller creates a thumbnail image based on the distribution data while the reproduction part reproduces the video data. According to this configuration, it is possible to easily create a thumbnail image because the thumbnail image can be created in parallel with the reproduction of the video.

In this case, preferably, the local server comprises a fourth local server, creating the thumbnail image. According to this configuration, it is possible to create the thumbnail image in the background of the reproduction of the video because the fourth local server dedicated to creating the thumbnail image is configured separately from the local server. Thus, it is possible to continue the creation of the thumbnail image even when the video being reproduced is stopped.

In the information device according to the above aspect, preferably, when the local server receives a stop signal for stopping the reproduction of the distribution data, the controller performs control for updating the reproduction list data based on the reproduction-continuation video data to start to reproduce the reproduction-continuation video data. According to this configuration, it is possible to prevent reproduction of a video from being terminated because the reproduction of the video based on the same format (a reproduction format based on list data) is continued based on the stop signal even when the user performs a reproduction stop operation (PAUSE operation).

In this case, preferably, when the local server receives a start signal for starting to reproduce the distribution data during the reproduction of the reproduction-continuation video data, the controller performs control for updating the reproduction list data based on the distribution data to reproduce the distribution data. According to this configuration, it is possible to quickly reproduce distribution data because a video of the same format is not terminated even when video reproduction is performed again after the reproduction of the video is temporarily stopped. Also, it is possible to resume the reproduction for the distribution data on the basis of the start signal even when the reproduction of the reproduction-continuation video data is performed.

In the configuration in which the controller performs the control for starting to reproduce the reproduction-continuation video data when the local server receives the above stop signal, preferably, the controller performs control for creating the reproduction-continuation video data based on the distribution data when the local server receives the stop signal. According to this configuration, it is possible to allow the user to feel that a normal stop operation is performed on the distribution data even when the reproduction-continuation video data separate from the distribution data is reproduced because a video based on the distribution data (including a video in which an image does not visually change) is reproduced even when the reproduction of the distribution data is stopped.

In a case, the reproduction-continuation video data is a still image, captured from the distribution data at a time point when the local server receives the stop signal.

In the configuration in which the controller performs the control for starting to reproduce the reproduction-continuation video data when the local server receives the above stop signal, preferably, the information device further includes a storage part, storing the reproduction-continuation video data. The controller performs control for reproducing the reproduction-continuation video data stored in the storage part when the local server receives the stop signal. According to this configuration, it is possible to suppress a load to be applied to the controller because the reproduction-continuation video data previously stored in the storage part is reproduced. As a result, it is possible to smoothly move from reproduction of distribution data to reproduction of the reproduction-continuation video data.

In a case, the reproduction-continuation video data is video data with single color. In another aspect, the controller performs is control for acquiring the reproduction-continuation video data from the external device via the communication part.

According to the present disclosure, as described above, it is possible to provide an information device capable of reproducing downloaded video data based on a transport stream format without converting the downloaded video data into another format.

DESCRIPTION OF THE EMBODIMENTS

Hereinafter, embodiments of the present disclosure will be described with reference to the drawings.

First Embodiment

Configuration of Communication Network System

First, a configuration of a communication network system T including an information device 100 according to the first embodiment of the present disclosure will be described with reference to FIGS. 1 to 4.

Figure 1:
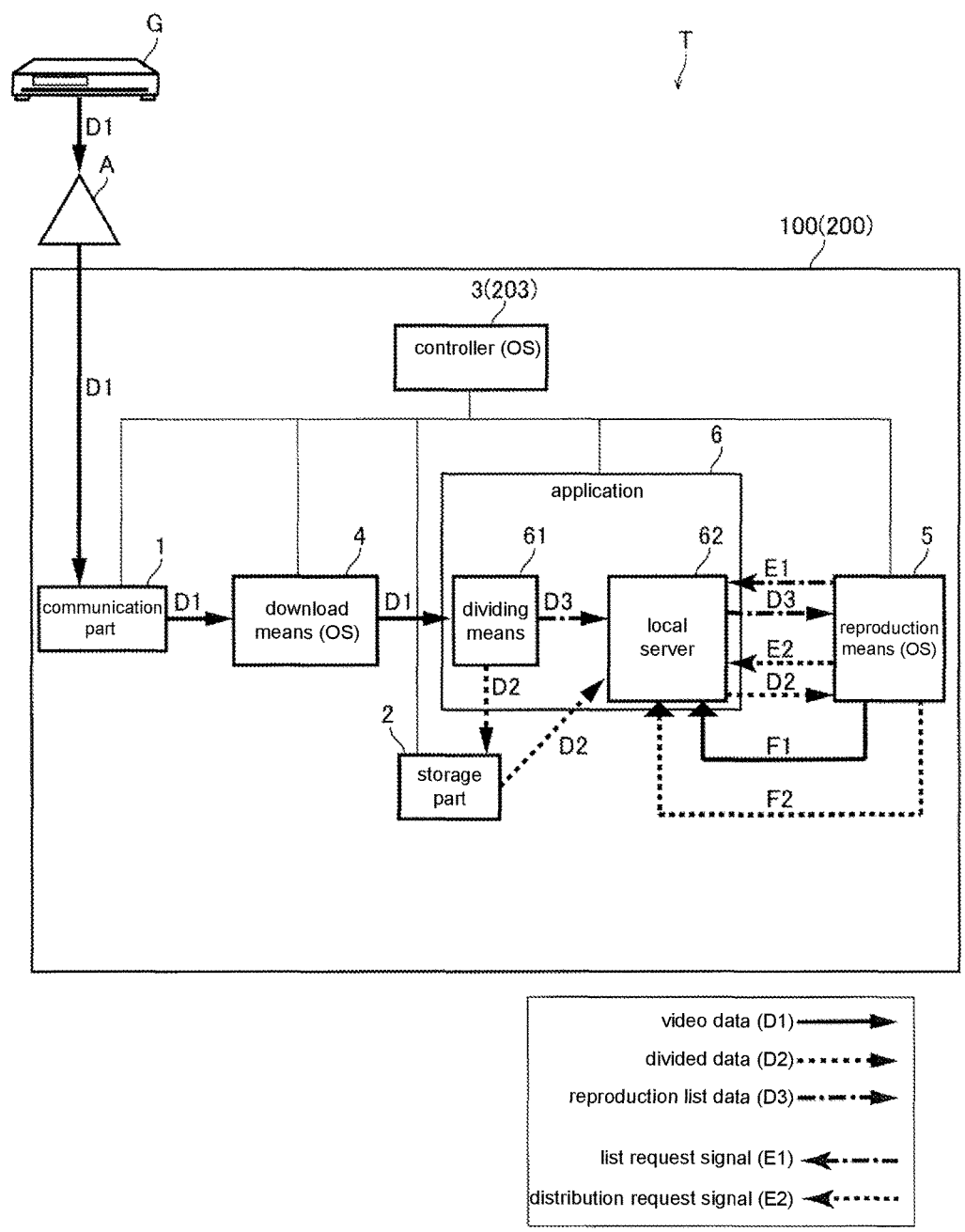
FIG. 1 is a block diagram illustrating the entire configuration of a communication network system including an information device according to first and second embodiments of the present disclosure.

As illustrated in FIG. 1, the information device 100 according to the first embodiment of the present disclosure functions as one element of the communication network system T. The communication network system T includes an access point A, an external device G, and the information device 100. Also, the communication network system T is configured so that the information device 100 can reproduce video data D1 recorded on the external device G by distributing (transmitting) the video data D1 via the access point A.

In the communication network system T, for example, it is possible to perform communication between the external device G and the information device 100 on the basis of technology of Digital Living Network Alliance (DLNA) (registered trademark).

The access point A is configured to perform mutual communication with the external device G and the information device 100 in a wired or wireless manner. That is, the access point A relays the communication between the external device G and the information device 100 within the communication network system T.

The external device G is configured so that a digital broadcast can be stored (recorded) as video data D1 of an MPEG2-transport stream (TS) format. Also, the external device G is configured so that the stored (recorded) video data D1 of the MPEG2-TS format is distributed to the information device 100 via the access point A if a distribution request is received from the information device 100. Also, examples of the external device G include a Blu-ray disc recorder or the like.

Configuration of Information Device

As illustrated in FIG. 1, the information device 100 includes a communication part 1, a storage part 2, and a controller 3. Also, an operating system (OS) including a download means 4 and a reproduction means 5 and an application 6 including a dividing means 61 and a local server 62 are installed in the information device 100. The application 6 is executed by the controller 3. Also, examples of the information device 100 include a smartphone, a tablet terminal, a notebook personal computer, and the like. Also, examples of the OS include iOS (registered trademark), Android (registered trademark), and the like. Also, the reproduction means 5 is an example of a "reproduction part" of the claims. Also, the dividing means 61 is an example of a "dividing part" of the claims.

Figure 2:
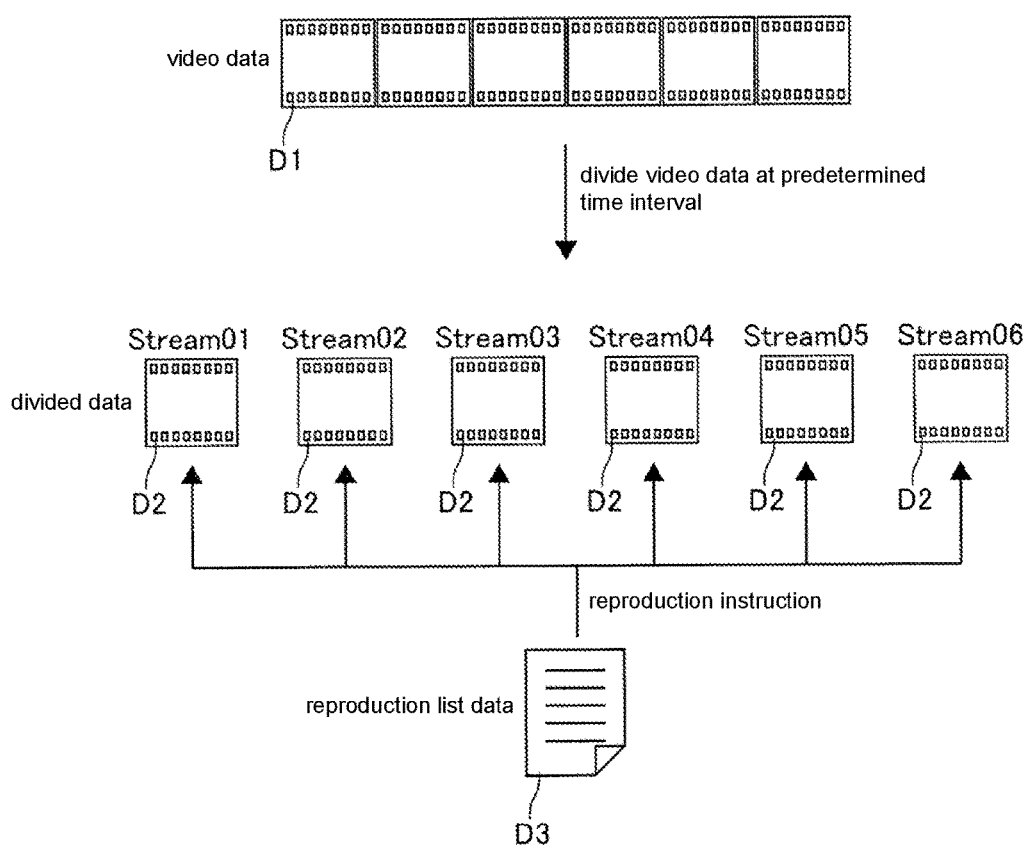
FIG. 2 is a diagram illustrating a division of video data based on an HLS scheme.
Figure 3:
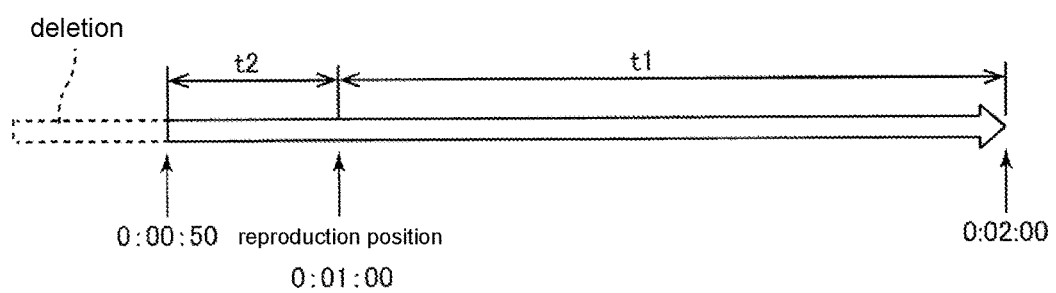
FIG. 3 is a diagram illustrating deletion and download of video data by a controller of the information device according to the first embodiment of the present disclosure.

Here, in a general HTTP live streaming (HLS) scheme, divided data D2 (segments) obtained by dividing the video data D1 in units of several seconds is arranged on a Web server (not illustrated) outside a reproduction device as illustrated in FIG. 2. In the HLS scheme, the reproduction device (not illustrated) continuously acquires the divided data D2 from the Web server to reproduce a video with reference to a uniform resource locator (URL) indicating an arrangement position of the divided data D2. At this time, the URL indicating the arrangement of the divided data D2 is written in reproduction list data D3 (a play list) for reproducing the divided data D2. The reproduction device first acquires the reproduction list data D3 from the Web server and then issues a distribution request (an acquisition request) of the divided data D2 to the Web server on the basis of the reproduction list data D3. Also, the divided data D2 is an example of "distribution data" of the claims.

In detail, in the reproduction of the video based on the general HLS scheme, on the Web server side, the video data D1 is divided to make the divided data D2, and the reproduction list data D3 in which a reproduction order made by the divided data D2 is described is created. Therefore, the reproduction device downloads the reproduction list data D3, and then reproduces a video by sequentially downloading the divided data D2 with reference to the URL of the Web server on the basis of the reproduction list data D3. Information such as the reproduction order of the divided data D2, a time interval required to reproduce one piece of the divided data D2 (hereinafter referred to as a reproduction time), and an address (URL) of each piece of the divided data D2 is described in the reproduction list data D3. Also, the reproduction list data D3 is a text file.

On the other hand, in the first embodiment as illustrated in FIG. 1, the divided data D2 is arranged in the local server 62 that is inside the information device 100, which is different from the general HLS scheme. Thus, by executing the application 6, the information device 100 distributes the video data D1 from the local server 62 to the reproduction means 5 in a pseudo manner based on the HLS scheme within the information device 100, so that the video can be reproduced in the reproduction means 5.

Hereinafter, description will be given in order from a configuration of an upstream side in the information device 100 (in an order in which the video data D1 or the divided data D2 is sent) and a configuration of the controller 3 will be described last.

The communication part 1 is configured to be able to communicate with the external device G that distributes the video data D1 of the MPEG2-TS format. In detail, the communication part 1 is configured to receive the video data D1 from the external device G under control of the controller 3 of the information device 100 when there is a reproduction request (distribution request) for a video by designating a predetermined URL including an Internet protocol (IP) address of the external device G within the communication network system T.

The download means 4 is configured to download the video data D1 from the external device G via the communication part 1 and transmit (transfer) the downloaded video data D1 to the dividing means 61 of the application 6.

The dividing means 61 is configured within the application 6 by the controller 3 and executed under control of the controller 3. Also, the dividing means 61 is configured to create the divided data D2 by dividing the video data D1 of the MPEG2-TS format and create or update the reproduction list data D3 for reproducing the divided data D2. For example, the dividing means 61 is configured to sequentially create the divided data D2 corresponding to a predetermined reproduction time (for example, 2 sec), wherein the number of pieces of the divided data D2 corresponds to a downloaded data capacity. The created divided data D2 is stored in the storage part 2. Also, the created reproduction list data D3 is transmitted (transferred) to the local server 62.

As a specific example, the dividing means 61 first creates the reproduction list data D3 in which the divided data D2 is not described and the reproduction time (for example, 2 sec) is described. Thereafter, if a block of video data D1 of 10 Mbytes is acquired, the dividing means 61 creates Stream 01 (video data D1 to be reproduced first) to Stream 10 by division and updates the reproduction list data D3. That is, a reproduction order from Stream 01 to Stream 10 or the like is additionally described in the reproduction list data D3. Thereafter, if a block of video data D1 of 3 Mbytes is acquired, the dividing means 61 creates Stream 11 to Stream 13 by division and updates the reproduction list data D3. That is, a reproduction order from Stream 11 to Stream 13 or the like is additionally described in the reproduction list data D3. Also, the controller 3 is configured to substantially simultaneously create the divided data D2 and update the reproduction list data D3.

The storage part 2 is configured to be able to continuously store the created divided data D2. Also, the storage part 2 has a function of storing pre-created divided data D2 while reproducing a video in the reproduction means 5 under the control of the controller 3. The pre-created divided data D2 is data in a first time t1 (for example, 60 sec) (see FIG. 3) after a reproduction position of the video. As a specific example, if the reproduction time of the divided data D2 is 2 seconds, 30 pieces of divided data D2 of Streams 01 to 30 are stored in the storage part 2 at a time point when the divided data D2 of Stream 01 is reproduced.

The storage part 2 has a function of deleting divided data D2 that precedes the reproduction position of the video by a second time t2 (for example, 10 seconds, see FIG. 3) while reproduction means 5 reproduces the video the under control of the controller 3. As a specific example, if the reproduction time of the divided data D2 is 2 seconds, divided data D2 of Stream 19 is deleted from the storage part 2 at a time point when divided data D2 of Stream 25 is reproduced.

The local server 62 is configured within the application 6 by the controller 3 and executed under control of the controller 3. The local server 62 is configured to transmit (pseudo-distribute) the divided data D2 and the reproduction list data D3 to the reproduction means 5. Also, the local server 62 acquires the reproduction list data D3 from the dividing means 61. Also, the local server 62 acquires the divided data D2 from the storage part 2. Also, the local server 62 is configured to transmit (pseudo-distribute) the reproduction list data D3 to the reproduction means 5 if a list request signal E1 transmitted from the reproduction means 5 is received. Also, the local server 62 is configured to transmit (pseudo-distribute) the divided data D2 to the reproduction means 5 if a distribution request signal E2 transmitted from the reproduction means 5 is received. Also, the reproduction list data D3 includes update data to be transmitted from the local server 62 to the reproduction means 5 for updating the reproduction list data D3.

The reproduction means 5 is configured to acquire the reproduction list data D3 from the local server 62. Also, the reproduction means 5 is configured to receive a pseudo-distribution of the divided data D2 from the local server 62 and reproduce a video by referring to a predetermined URL based on the reproduction list data D3.

In detail, as illustrated in FIG. 1, the reproduction means 5 is configured to transmit the list request signal E1 to the local server 62 based on the reproduction list data D3. The list request signal E1 is transmitted repeatedly from the reproduction means 5 to the local server 62 at a first time interval t0 (for example, an interval of 2 sec, see FIG. 4). For example, if Streams 01 to 33 are described in the reproduction list data D3 as a reproduction order, the list request signal E1 for requesting that the reproduction list data D3 related to the divided data D2 be reproduced next to Stream 33 is transmitted to the local server 62.

Then, the local server 62, at which the list request signal E1 is received, is configured to transmit (pseudo-distribute) the reproduction list data D3 (update data) to the reproduction means 5 under control of the controller 3.

Thereafter, the reproduction means 5 updates the previously acquired reproduction list data D3 based on the reproduction list data D3 (update data) transmitted from the local server 62. For example, in a case that Streams 01 to 35 are described in the reproduction list data D3 as a reproduction order, the reproduction means 5 is configured to additionally describe Stream 36 as divided data D2 to be reproduced next to Stream 35. Also, as described above, Stream 36 is divided data D2 in the first time t1 (for example, 60 seconds, see FIG. 3) after the reproduction position of the video (Stream 06).

Further, in a case that the reproduction list data D3 (update data) is received (the reproduction list data D3 is updated), the reproduction means 5 is configured to transmit the distribution request signal E2 to the local server 62, wherein the distribution request signal E2 is to request a distribution of new divided data D2 (Stream 36) based on the reproduction list data D3.

Therefore, the local server 62, at which the distribution request signal E2 is received, is configured to transmit (pseudo-distribute) the divided data D2 (Stream 36) to the reproduction means 5 under control of the controller 3.

The controller 3 is configured to control the communication part 1 and the storage part 2 and execute the application 6.

The controller 3 performs control for downloading video data D1 from the external device G via the communication part 1. Also, the controller 3 performs control for creating divided data D2 having the same format as the video data D1 and the reproduction list data D3 for reproducing the divided data D2 from the downloaded video data D1 in the dividing means 61. Also, the controller 3 constructs the local server 62 within the application 6, wherein the local server 62 transmits (pseudo-distributes) the divided data D2 and the reproduction list data D3 to the reproduction means 5. Also, the controller 3 performs control for reproducing the divided data D2 while updating the reproduction list data D3.

Here, in the first embodiment, the controller 3 performs control in a manner that the divided data D2 and the reproduction list data D3 are not transmitted (pseudo-distributed) from the local server 62 to the reproduction means 5 until the reproduction list data D3 is updated.

Also, the reproduction list data D3 includes data indicating whether or not it has been newly updated from the reproduction list data D3 previously transmitted to the reproduction means 5.

In detail, if the download of the video data D1 by the download means 4 is stopped and the update of the reproduction list data D3 is not performed, the controller 3 performs control for putting the transmission of the reproduction list data D3 from the local server 62 to the reproduction means 5 on standby (stopping, no transmission) even when the local server 62 receives the list request signal E1 from the reproduction means 5. In addition, regarding that the download is stopped, for example it can be a case that the reproduction of the video in the reproduction means 5 is stopped (PAUSE) according to a user operation, or a case that the communication is disabled (difficult) due to a malfunction of a communication state of the communication network system T, or the like.

The controller 3 performs control for transmitting the reproduction list data D3 to the reproduction means 5 based on the that the reproduction list data D3 is updated after the stop of the download of the video data D1 is released by the download means 4. In detail, the controller 3 performs control for immediately transmitting the created reproduction list data D3 (updated data) to the reproduction means 5 if the download of the video data D1 is performed by the download means 4, the reproduction list data D3 (updated data) is created, and the reproduction list data D3 (updated data) and the divided data D2 are transmitted to the local server 62.

Video Reproduction Process

Figure 4:
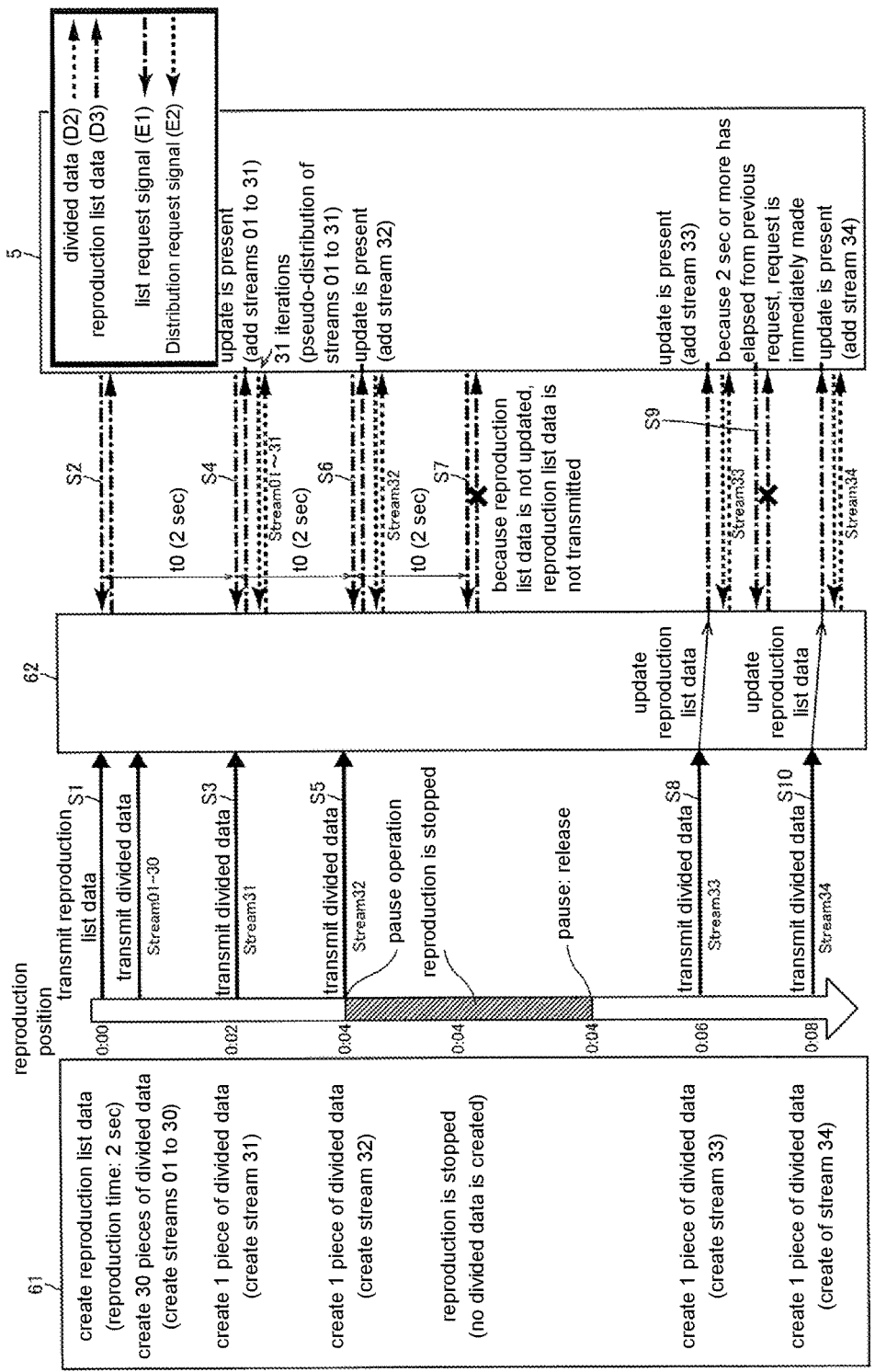
FIG. 4 is a sequence chart illustrating a video reproduction process by the controller of the information device according to the first embodiment of the present disclosure.

Next, the video reproduction process of the information device 100 will be described on the basis of a sequence chart with reference to FIG. 4. In the video reproduction process, an operation of the application 6 is executed by the controller 3. Here, an example in which the reproduction time of one piece of divided data D2 is 2 seconds will be described.

In step S1, the dividing means 61 creates the reproduction list data D3 and transmits the created reproduction list data D3 to the local server 62. At this point, a reproduction order of the divided data D2 is not described in the created reproduction list data D3. Also, the dividing means 61 creates Streams 01 to 30 which are divided data D2 and transmits Streams 01 to 30 to the local server 62.

In step S2, the list request signal E1 is transmitted from the reproduction means 5 to the local server 62. When the local server 62 receives the list request signal E1, the reproduction list data D3 is transmitted (pseudo-distributed) to the reproduction means 5. Also, the list request signal E1 is repeatedly transmitted from the reproduction means 5 to the local server 62 at an interval of 2 sec which is the same as the reproduction time (first time interval t0 (see FIG. 4)).

In step S3 that is a reproduction position 2 sec after step S1, Stream 31 which is divided data D2 is created by the dividing means 61 and transmitted to the local server 62.

In step S4, 2 seconds after step S2, the list request signal E1 is transmitted from the reproduction means 5 to the local server 62. When the local server 62 receives the list request signal E1, the reproduction list data D3 (update data) is transmitted (pseudo-distributed) to the reproduction means 5. The reproduction means 5 additionally describes Stream 01 which is divided data D2 in the reproduction list data D3 (a play list). Further, the distribution request signal E2 is transmitted from the reproduction means 5 to the local server 62. When the local server 62 receives the distribution request signal E2, divided data D2 (Stream 01) is transmitted (pseudo-distributed) to the reproduction means 5. Also, a similar process is performed for Streams 02 to 31. Thereby, the reproduction means 5 starts to reproduce Stream 01.

In step S5 which is a reproduction position 2 sec after step S3, Stream 32 which is divided data D2 is created by the dividing means 61 and transmitted to the local server 62. Simultaneously, the reproduction of the video performed by the reproduction means 5 is stopped (PAUSE) based on the user operation. That is, the creation of divided data D2 after Stream 33 is stopped and the update of the reproduction list data D3 is stopped. Also, in a case that the reproduction is stopped that is different from the case of completion of reproduction, divided data D2 stored in the storage part 2 by buffering (data after the first time t1 (see FIG. 3) and data before the second time t2 (see FIG. 3)) is not deleted.

In step S6, 2 seconds after step S4, as in step S4, divided data D2 (Stream 32) is transmitted (pseudo-distributed) from the local server 62 to the reproduction means 5.

In step S7, 2 seconds after step S6, the list request signal E1 is transmitted from the reproduction means 5 to the local server 62. On the other hand, no reproduction list data D3 is transmitted (pseudo-distributed) from the local server 62 to the reproduction means 5. This is because divided data D2 (Stream 33) to be subsequently transmitted (pseudo-distributed) is not yet created and the reproduction list data D3 is not updated.

PAUSE is released and Stream 33 which is divided data D2 is created by the dividing means 61 in step S8 at a reproduction position 2 sec after step S5 and transmitted to the local server 62. At this time (the previous step S7), because the list request signal E1 for Stream 33 has already been transmitted from the reproduction means 5 to the local server 62, the reproduction list data D3 (update data) for Stream 33 is immediately transmitted (pseudo-distributed) from the local server 62 to the reproduction means 5 when Stream 33 is created. The reproduction means 5 additionally describes Stream 33 which is divided data D2 in the reproduction list data D3 (a play list). Further, a distribution request signal E2 is transmitted from the reproduction means 5 to the local server 62. When the local server 62 receives the distribution request signal E2, the divided data D2 (Stream 33) is transmitted (pseudo-distributed) to the reproduction means 5.

In step S9, immediately after the divided data D2 (Stream 33) is transmitted (pseudo-distributed) to the reproduction means 5, the list request signal E1 for Stream 34 is transmitted from the reproduction means 5 to the local server 62. At this time, because 2 seconds has not elapsed from the reproduction position (0:06) of step S8, divided data D2 (Stream 34) is not created. That is, in relation to the list request signal E1 for Stream 34, at this time, no reproduction list data D3 is transmitted (pseudo-distributed) from the local server 62 to the reproduction means 5.

In step S10, process similar to step S8 is performed. Thereafter, processes of steps S9 and S8 are iterated.

Effects of First Embodiment

In the first embodiment, the following effects can be obtained.

In the first embodiment, as described above, the controller 3 is provided to perform the control for downloading video data D1 from the external device G via the communication part 1 capable of communicating with the external device G, and the control for executing the application 6 for creating divided data D2 having the same format (a transport stream format or the like) as the video data D1 from the downloaded video data D1. Thus, the local server 62, which transmits the divided data D2 to the reproduction means 5, is configured within the application 6 by the controller 3. Thereby, the information device 100 can perform streaming reproduction without converting the video data D1 downloaded based on the transport stream format into another format because the transmission (streaming) of the video from the local server 62 is performed on the application 6 in a pseudo manner by creating the divided data D2 having the same format from the video data D1 having the transport stream format downloaded by the communication part 1. Also, because the conversion of the video data D1 is unnecessary, a user can save time and labor of performing an operation of conversion of the video data D1. Also, if the download of the video data D1 from the external device G and the reproduction of the video are simultaneously performed, the conversion of the video data D1 is not performed, and thus it is not necessary to simultaneously perform the conversion of the video data D1 and the reproduction of the video. Thereby, it is possible to reduce a load applied to the controller 3. Also, because the video data D1 of the transport stream format can be reproduced in the same format as the transport stream format by executing the application 6, it is possible to reproduce video data D1 of the transport stream format by only installing the application 6 in an information device 100 capable of downloading the video data D1 of the transport stream format. As a result, it is possible to easily reproduce video data D1 downloaded in the transport stream format in various information devices 100.

Also, the controller 3 is configured to create the divided data D2 having the same format as downloaded video data D1 and the reproduction list data D3 for reproducing the divided data D2 from the downloaded video data D1 and execute the application 6 for controlling the reproduction of the divided data D2, the local server 62 is configured to transmit the reproduction list data D3 to the reproduction means 5, and the controller 3 is configured to perform control for putting transmission of the reproduction list data D3 from the local server 62 to the reproduction means 5 on standby (stopping, no transmission) until the reproduction list data D3 is updated. Thereby, even when the reproduction means 5 of the information device 100 is configured to stop the reproduction of a video based on that information indicating that the reproduction list data D3 is not updated is transmitted from the local server 62 to the reproduction means 5 a plurality of times in a state in which the reproduction list data D3 is not updated (even when the reproduction means 5 is configured to stop the reproduction of the video on the basis of the fact that a predetermined state in which the reproduction list data D3 is not updated continues), it is possible to prevent the reproduction of the video from being terminated by putting the transmission of the reproduction list data D3 from the local server 62 of the application 6 to the reproduction means 5 on standby (stopping, no transmission) in a state that the reproduction list data D3 is not updated.

Also, in the first embodiment, as described above, the list request signal E1 for requesting the transmission of the reproduction list data D3 is repeatedly transmitted from the reproduction means 5 to the local server 62 at first time interval t0, and the controller 3 is configured to perform (non-transmission) control for putting the transmission of the reproduction list data D3 from the local server 62 to the reproduction means 5 on standby (stopping the transmission) even when the local server 62 has received the list request signal E1 from the reproduction means 5. Thereby, it is possible to more reliably prevent the reproduction of the video from being terminated because the reproduction list data D3 which has not been updated is not transmitted from the local server 62 to the reproduction means 5 even when the list request signal E1 is received.

Also, in the first embodiment, as described above, when the download of the video data D1 is stopped, the controller 3 is configured to perform (non-transmission) control for putting the transmission of the reproduction list data D3 from the local server 62 to the reproduction means 5 on standby (stopping the transmission) even when the local server 62 receives the list request signal E1 from the reproduction means 5. Thereby, it is possible to prevent the reproduction of the video from being terminated even when the user temporarily stops the reproduction of the video or the communication state is temporarily bad.

Also, in the first embodiment, as described above, the controller 3 is configured to perform control for transmitting the reproduction list data D3 from the local server 62 to the reproduction means 5 based on that the reproduction list data D3 is updated after the stop of the download of the video data D1 is released. Thereby, if a state in which the user has temporarily stopped the reproduction of the video or a state in which the communication state is temporarily bad is released and normal download is resumed, the reproduction means 5 can reliably receive the updated reproduction list data D3.

Also, in the first embodiment, as described above, the distribution request signal E2 for requesting the transmission of the divided data D2 is configured so that the distribution request signal E2 is transmitted from the reproduction means 5 to the local server 62 based on the updated reproduction list data D3 when the reproduction means 5 receives the updated reproduction list data D3, and the controller 3 is configured to perform control for transmitting the divided data D2 from the local server 62 to the reproduction means 5 when the distribution request signal E2 is received. Thereby, it is possible to resume reproduction of a video without terminating the reproduction of the video because the divided data D2 is transmitted (pseudo-distributed) from the local server 62 to the reproduction means 5 by transmitting the distribution request signal E2 from the reproduction means 5 to the local server 62 after the reproduction means 5 receives the updated reproduction list data D3.

Second Embodiment

Figure 5:
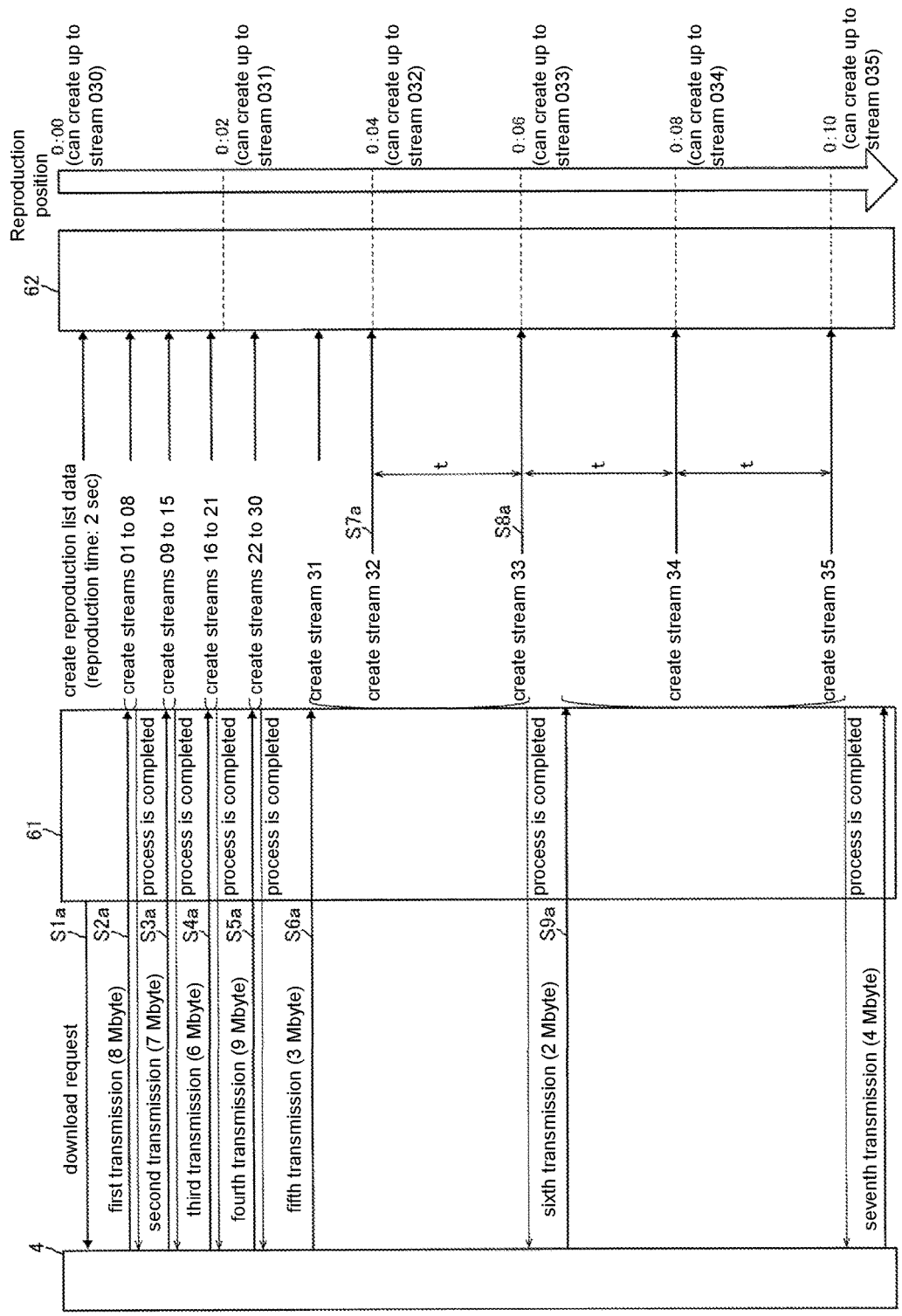
FIG. 5 is a sequence chart illustrating a process for creating divided data by a controller of the information device according to the second embodiment of the present disclosure.

Next, the second embodiment will be described with reference to FIGS. 1, 5, and 6. In the second embodiment, an example in which the creation of the divided data D2 and the update of the reproduction list data D3 are periodically performed will be described in addition to the configuration of the above-described first embodiment.

Configuration of Information Device

As illustrated in FIG. 1, the information device 200 according to the second embodiment includes a controller 203. The controller 203 is configured to periodically perform the creation of divided data D2 and the update of reproduction list data D3 at a second time interval t (for example, 2 seconds, see FIG. 5) after the completion of the creation of the divided data D2 in the first time t1 (see FIG. 3) after a reproduction position at which reproduction of a video starts (a part of a start of the video). Also, the divided data D2 is divided in correspondence with a predetermined reproduction time (a time interval necessary for reproduction of one piece of the divided data D2) in the dividing means 61 of the application 6. Also, the second time interval t is the same time interval as the reproduction time. For example, both the second time interval t and the reproduction time are time intervals of 2 sec. Also, the dividing means 61 is an example of a "dividing part" of the claims.

The controller 203 is configured to periodically create the divided data D2 and update the reproduction list data D3 at second time interval t even when video data D1 (a block of video data D1) divided into a plurality of pieces of divided data D2 is downloaded at one time from the external device G.

Also, as in the first embodiment, the controller 203 of the second embodiment performs control in which the divided data D2 and the reproduction list data D3 are not transmitted (pseudo-distributed) from the local server 62 to the reproduction means 5 until the reproduction list data D3 is updated.

Creation Process of Divided Data

Next, a process for creating divided data D2 of the information device 200 will be described based on a sequence chart with reference to FIG. 5. In a video reproduction process, an operation of the application 6 is executed by the controller 203. Also, an example in which the second time interval t and the reproduction time are set to 2 seconds will be described below.

In step S1a, a download request is sent from the dividing means 61 to the download means 4.

In step S2a, the first transfer of video data D1 of 8 Mbytes from the download means 4 to the dividing means 61 is performed. When the transfer is performed, Streams 01 to 08, i.e., the divided data D2 are created by the dividing means 61 and reproduction list data D3 is updated. If the creation of Streams 01 to 08 is completed, Streams 01 to 08 (divided data D2) are transmitted to the local server 62. Also, if the creation of Streams 01 to 08 is completed, a notification of completion of the creation process is transmitted from the dividing means 61 to the download means 4. The notification of the completion of the creation process serves as a trigger (beginning) of next transfer of the video data D1. Steps S3a to S5a respectively performs the process similar to step S2a.

In step S6a, the fifth transfer of video data D1 of 3 Mbytes from the download means 4 to the dividing means 61 is performed. Also, the video data D1 of 3 Mbytes corresponds to Streams 31 to 33 which are divided data D2. Also, at the time point of step S6a, a reproduction position is set to be around (i.e., before or after) 3 sec (before 4 sec). Therefore, because at the time point of step S6a, the divided data in the first time t1 (for example 60 sec, see FIG. 3) after the reproduction position can be previously stored in the storage part 2, it is possible to create the divided data up to Stream 31, and it is impossible to create Streams 32 and 33, at the time point of step S6a.

Because the reproduction means 5 starts to reproduce the next divided data D2 in step S7a in which the reproduction position is set to 0:04, it is possible to create Stream 32. Thus, the dividing means 61 immediately creates Stream 32.

Because the reproduction means 5 starts to reproduce the next divided data D2 in step S8a at which a reproduction position that which only the second time interval t is elapsed from step S7a is set to 0:06, it is possible to create Stream 33. Thus, the dividing means 61 immediately creates Stream 33. Also, when the creation of Streams 31 to 33 is completed, a notification of completion of the creation process is transmitted from the dividing means 61 to the download means 4.

Therefore, after step S9a, processes similar to steps S6a to S8a are iterated.

Creation Process of Divided Data

A process of creating a plurality of pieces of divided data D2 based on video data D1 (a block of video data D1) downloaded at one time will be described based on a flowchart with reference to FIGS. 5 and 6. In a process of creating the divided data D2, an operation of the application 6 is executed by the controller 203. Also, the fifth transferred (a block of) video data D1 of 3 Mbytes illustrated in FIG. 5 will be described. Also, (a block of) video data D1 of 3 Mbytes corresponds to Streams 031 to 033 which are divided data D2.

Figure 6:
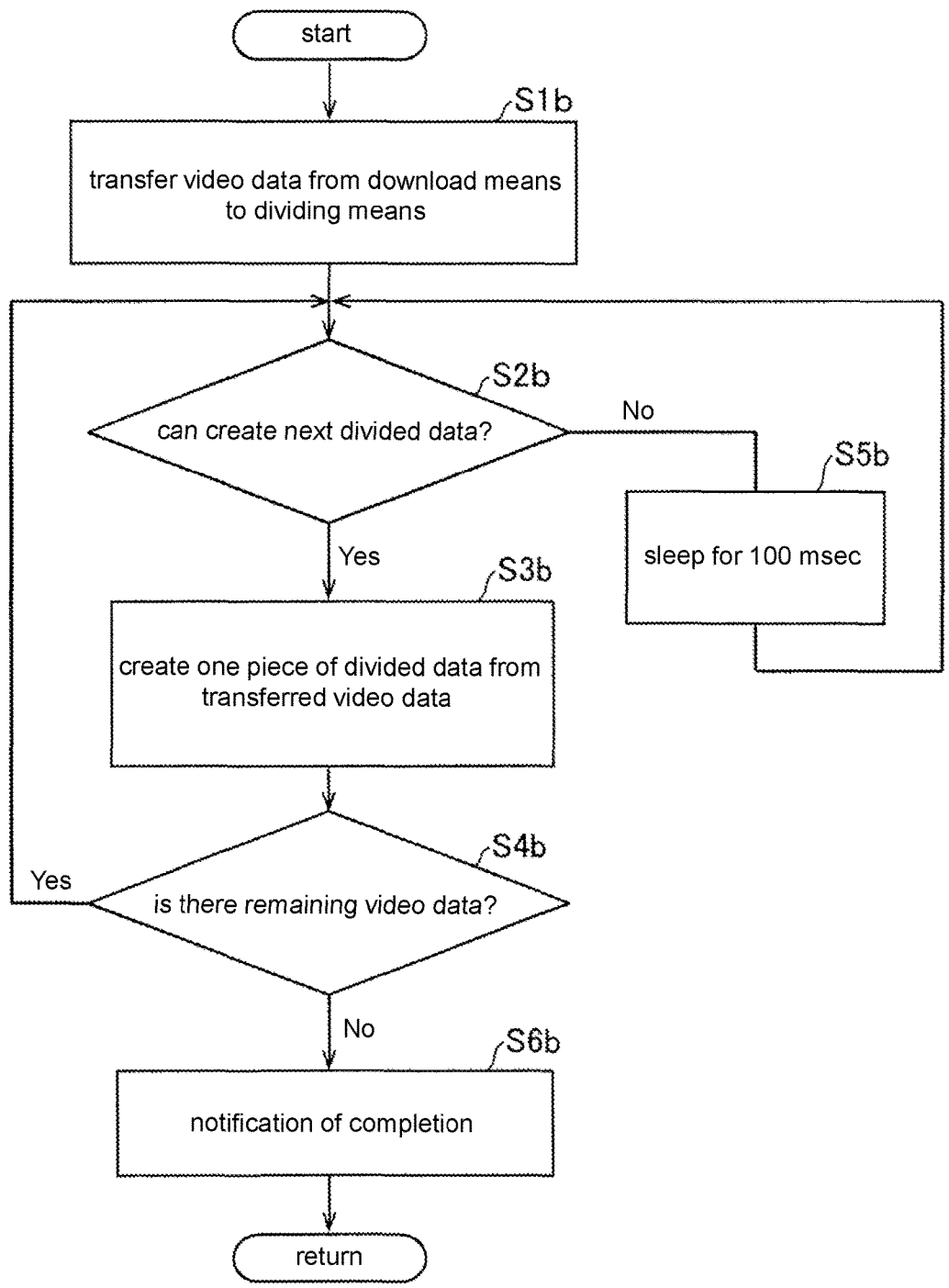
FIG. 6 is a flowchart illustrating a process for creating divided data by the controller of the information device according to the second embodiment of the present disclosure.

As illustrated in FIG. 6, in step S1b, transferring video data D1 of 3 Mbytes from the download means 4 to the dividing means 61 is performed.

In step S2b, it is determined whether or not the next divided data D2 can be created. That is, it is determined whether or not Stream 31 can be created. In other words, it is determined whether or not a reproduction position 0:02 at which Stream 31 can be created has passed. In FIG. 5, because the reproduction position 0:02 has already passed, the process moves to step S3b.

In step S3b, one piece of divided data D2 is created from the transferred video data D1 of 3 Mbytes. That is, Stream 31 is created.

In step S4b, it is determined whether or not the divided data D2 can be created from the remaining video data D1 is present in the dividing means 61. As described above, (a block of) video data D1 of 3 Mbytes corresponds to Streams 031 to 033, i.e., the divided data D2. Therefore, at the time point when Stream 31 is created, the remaining video data D1 for creating Streams 032 and 033 is present in the dividing means 61. Thus, the process returns to step S2b.

In step S2b, it is determined again whether or not Stream 32 can be created. In other words, it is determined whether or not a reproduction position 0:04 at which Stream 32 can be created (a reproduction position at which the second time interval t (2 sec) (see FIG. 5) is elapsed from the reproduction position 0:02) has passed. Immediately after Stream 31 is created, the process moves to step S5b because the reproduction position 0:04 has not passed.

A sleep process (a process of awaiting the passage of time) is performed by only 100 m seconds in step S5b and the process returns to step S2b. As described above, steps S2b and S5b are iterated until the reproduction position 0:04 is passed. If the reproduction position 0:04 is passed, the process moves to step S3b. The process returns from step S4b to step S2b, and Stream 33 similar to Stream 32 is created. If divided data D2 is created from all of (a block of) video data D1 of 3 Mbytes, the process moves from step S4b to step S6b and a notification of completion of a process of creating the divided data D2 (Streams 31 to 33) is transmitted from the dividing means 61 to the download means 4.

Also, other components of the second embodiment are similar to those of the above first embodiment.

Effects of Second Embodiment

In the second embodiment, the following effects can be obtained.

In the second embodiment, as described above, the controller 203 is configured to periodically perform the creation of the divided data D2 and the update of the reproduction list data D3 at the second time interval t. Thereby, because the creation of the divided data D2 and the update of the reproduction list data D3 are periodically performed, it is possible to disperse a load applied to the controller 203 during the creation of the divided data D2 and the update of the reproduction list data D3.

Also, other effects of the second embodiment are similar to those of the above first embodiment.

Third Embodiment

Next, the third embodiment will be described with reference to FIG. 7. In the third embodiment, unlike the above first embodiment configured to include one local server 62, an example configured to include two local servers (for example, a first local server 62a and a second local server 62b) will be described.

Configuration of Information Device

Figure 7:
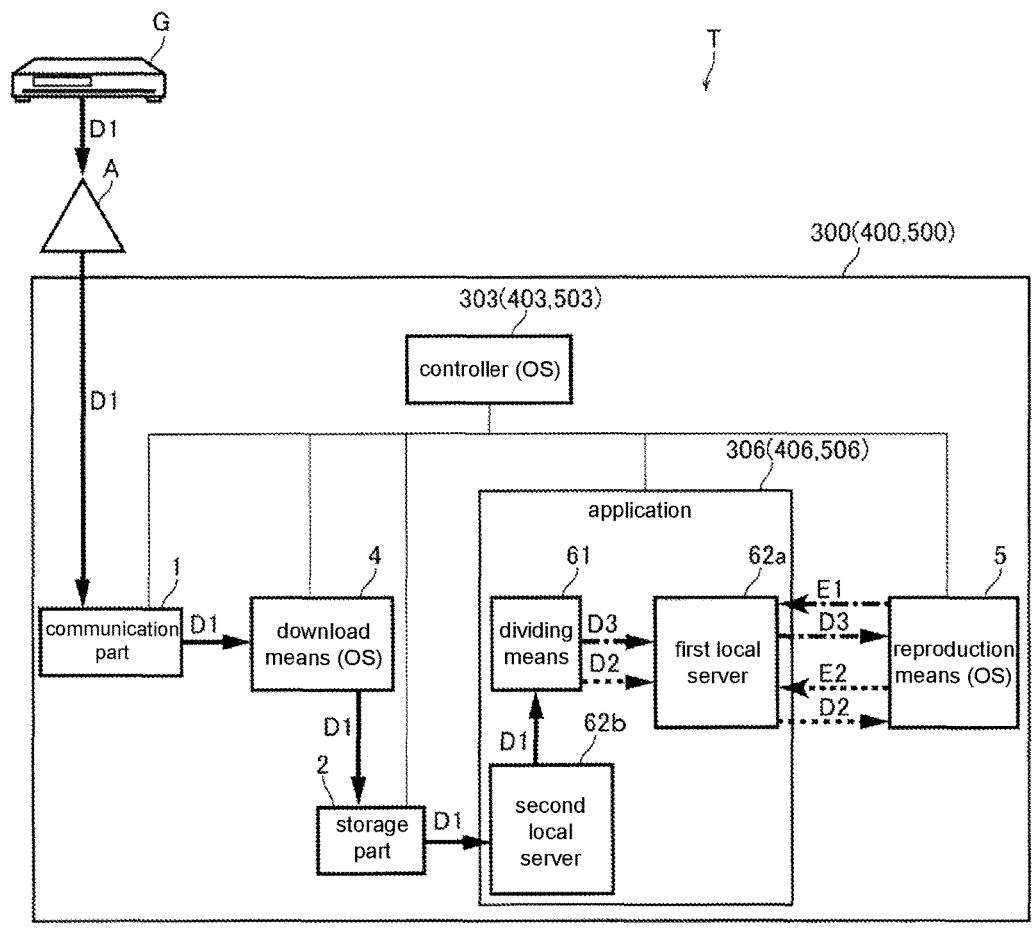
FIG. 7 is a block diagram illustrating a configuration of an information device according to a third embodiment of the present disclosure.

As illustrated in FIG. 7, an information device 300 according to the third embodiment includes a controller 303. The controller 303 includes the first local server 62a and the second local server 62b within an application 306. Also, the first local server 62a and the second local server 62b are always configured within the application 306. Also, in the third embodiment, a case that all video data D1 is downloaded by a download means 4 and the downloaded video data D1 is stored in a storage part 2 will be described. The storage part 2 transmits the video data D1 to a dividing means 61 via the second local server 62b.

The first local server 62a has a function of transmitting (pseudo-distributing) the divided data D2 and the reproduction list data D3 to a reproduction means 5. Also, the second local server 62b has a function of transmitting the video data D1 to the dividing means 61 in order to divide the video data D1 and create the divided data D2 within the application 306. Also, the video data D1 is transmitted from the storage part 2 to the second local server 62b.

Also, other components of the third embodiment are similar to those of the above first embodiment.

Effects of Third Embodiment

In the third embodiment, the following effects can be obtained.

In the third embodiment, as described above, the first local server 62a that transmits the divided data D2 and the reproduction list data D3 to the reproduction means 5, the dividing means 61 that divides the downloaded video data D1 into two or more within the application 306, and the second local server 62b that transmits video data D1 to the dividing means 61 are provided in the application 306. Thereby, because the first local server 62a and the second local server 62b are configured within the application 306, it is possible to reduce a load applied to the local servers by dispersing the load to the two local servers (the first local server 62a and the second local server 62b) as compared with the case configured to include one local server. Thus, it is possible to prevent the application 306 from being stopped and prevent reproduction of a video from being stopped due to the load applied to the local server.

Also, other effects of the third embodiment are similar to those of the above first embodiment.

Fourth Embodiment

Figure 8:
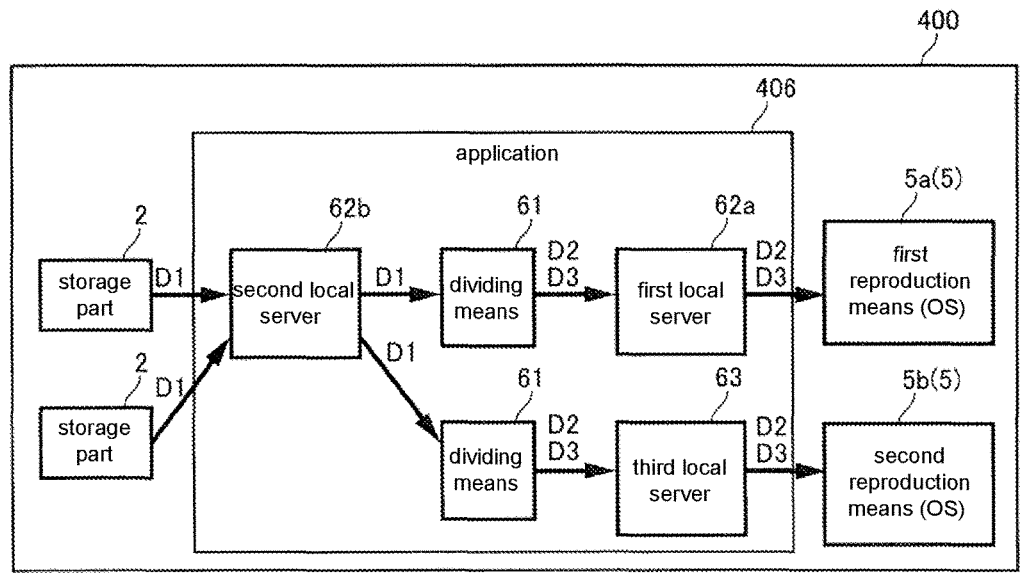
FIG. 8 is a block diagram illustrating a configuration of an information device according to a fourth embodiment of the present disclosure.

Next, the fourth embodiment will be described with reference to FIGS. 7 and 8. In addition to the configuration of the above third embodiment, the fourth embodiment describes an example configured to include a third local server 63 that transmits the divided data D2 and the reproduction list data D3 to a reproduction means 5, which is separately from the first local server 62*a* and the second local server 62*b*.

Configuration of Information Device

As illustrated in FIG. 7, an information device 400 according to the fourth embodiment includes a controller 403. The controller 403 includes the third local server 63 separately from the first local server 62*a* and the second local server 62*b* within an application 406 illustrated in FIG. 8.

A reproduction means 5 includes a first reproduction means 5*a* and a second reproduction means 5*b*. The first reproduction means 5*a* and the second reproduction means 5*b* can simultaneously reproduce videos different from each other. That is, the reproduction means 5 can reproduce two videos so that the two videos can be viewed side by side in the foreground.

The first local server 62*a* has a function of transmitting the divided data D2 and the reproduction list data D3 to the first reproduction means 5*a*. Also, the third local server 63 has a function of transmitting the divided data D2 and the reproduction list data D3 to the second reproduction means 5*b*.

The controller 403 includes two dividing means 61 that create and transmit divided data and reproduction list data for the first local server 62*a* and the third local server 63 within the application 406. Also, different video data D1 is transmitted from a storage part 2 to the two dividing means 61 via the second local server 62*b*.

Also, other components of the fourth embodiment are similar to the above third embodiment.

Effects of Fourth Embodiment

In the fourth embodiment, the following effects can be obtained.

In the fourth embodiment, as described above, the third local server 63, which transmits the divided data D2 and the reproduction list data D3 to the reproduction means 5 (the first reproduction means 5*a* and the second reproduction means 5*b*) separately from the first local server 62*a* and the second local server 62*b*, is provided in the application 406 by the controller 403. Thereby, when a plurality of videos are simultaneously viewed, it is possible to reduce a load applied to the local server which performs transmission of data to the reproduction means 5 (the first reproduction means 5*a* and the second reproduction means 5*b*) as compared with the case that the divided data D2 and the reproduction list data D3 are transmitted (pseudo-distributed) to the reproduction means 5 (the first reproduction means 5*a* and the second reproduction means 5*b*) by one local server. Thus, it is possible to prevent the application 406 from being stopped and prevent reproduction of a video from being stopped due to the load applied to the local server. Also, it is possible to continue reproduction of another video even when reproduction of one video has been stopped.

Also, other effects of the fourth embodiment are similar to those of the above third embodiment.

Fifth Embodiment

Figure 9:
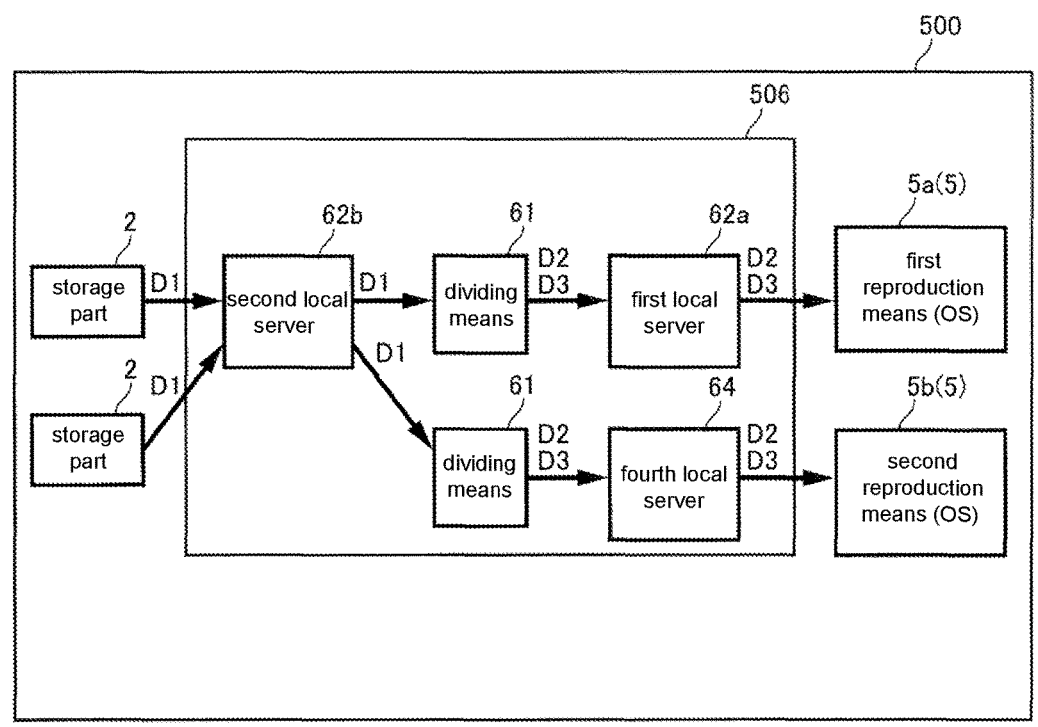
FIG. 9 is a block diagram illustrating a configuration of an information device according to a fifth embodiment of the present disclosure.

Next, the fifth embodiment will be described with reference to FIGS. 7, 9, and 10. Unlike the above fourth embodiment that two videos are reproduced for viewing, the fifth embodiment describes an example that one of two videos is reproduced for viewing and the other video is reproduced for capturing.

Configuration of Information Device

As illustrated in FIG. 7, an information device 500 according to the fifth embodiment includes a controller 503. FIG. 9 illustrates the controller 503 includes a fourth local server 64 within an application 506 for creating a thumbnail image P, which is separately from the first local server 62*a* and the second local server 62*b*. The controller 503 configures a first reproduction means 5*a* to reproduces a video to be viewed. Also, the controller 503 configures a second reproduction means 5*b* to perform capturing and reproduce a video in the background for creating the thumbnail image P. Also, the created thumbnail image P is stored in a storage part 2.

Figure 10:
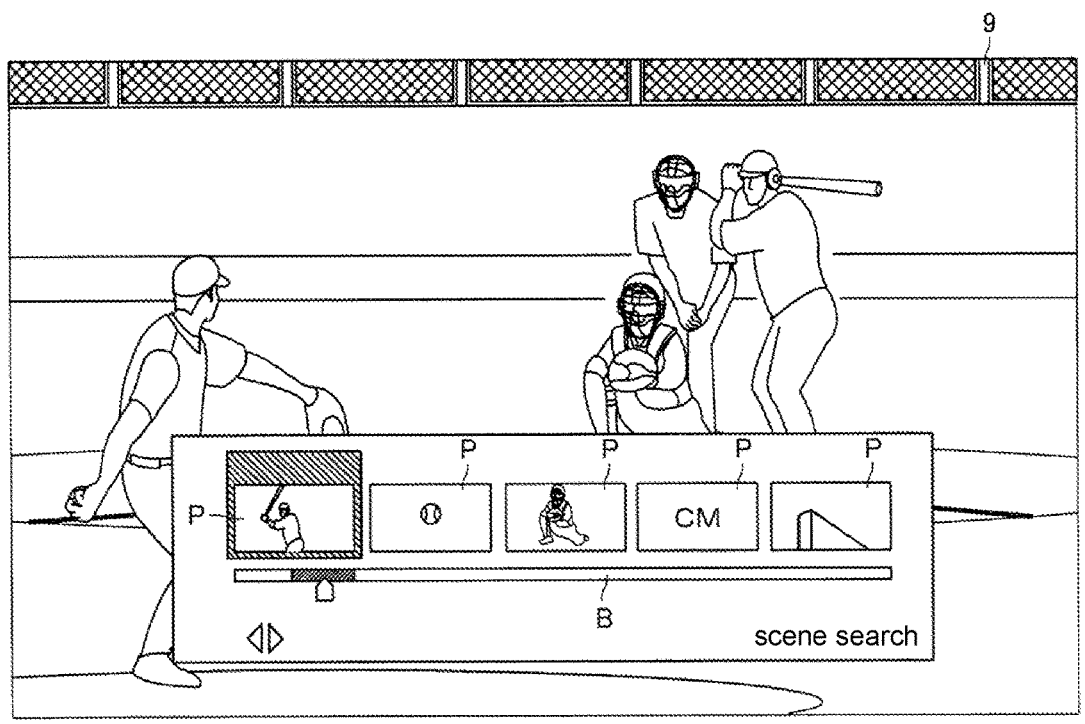
FIG. 10 is a diagram illustrating a state in which a thumbnail image is displayed on a display part of the information device according to the fifth embodiment of the present disclosure.

As illustrated in FIG. 10, the controller 503 performs is control for displaying a created thumbnail image P on a display part 9 of the information device 500 together with a seek bar B.

Also, other components of the fifth embodiment are similar to those of the above fourth embodiment.

Effects of Fifth Embodiment

In the fifth embodiment, the following effects can be obtained.

In the fifth embodiment, as described above, the controller 503 is configured to create the thumbnail image P based on the divided data D2 while a video is reproduced in the reproduction means 5 (the second reproduction means 5*b*). Thereby, it is possible to easily create the thumbnail image P because it is possible to create the thumbnail image P in parallel with the reproduction of the video.

Also, in the fifth embodiment, as described above, the fourth local server 64 for creating the thumbnail image P is provided in the application 506, which is separately from a first local server 62*a* and a second local server 62*b*. Thereby, because the dedicated fourth local server 64 for creating the thumbnail image P is configured separately from the first local server 62*a* and the second local server 62*b*, it is possible to create the thumbnail image P in the background of the reproduction of the video. Thus, it is possible to continue the creation of the thumbnail image P even though a video being reproduced is stopped.

Also, other effects of the fifth embodiment are similar to those of the above fourth embodiment.

Sixth Embodiment

Next, the sixth embodiment will be described with reference to FIGS. 11 and 12. Unlike the above first embodiment that the controller 3 is configured to perform control for putting the transmission of reproduction list data D3 from the local server to the reproduction means 5 on standby (stopping) until the reproduction list data D3 is updated, the sixth embodiment described an example in which the controller 603 performs control for updating the reproduction list data D3 based on the reproduction-continuation video data D4 separate from the divided data D2 will be described.

Configuration of Information Device

Figure 11:
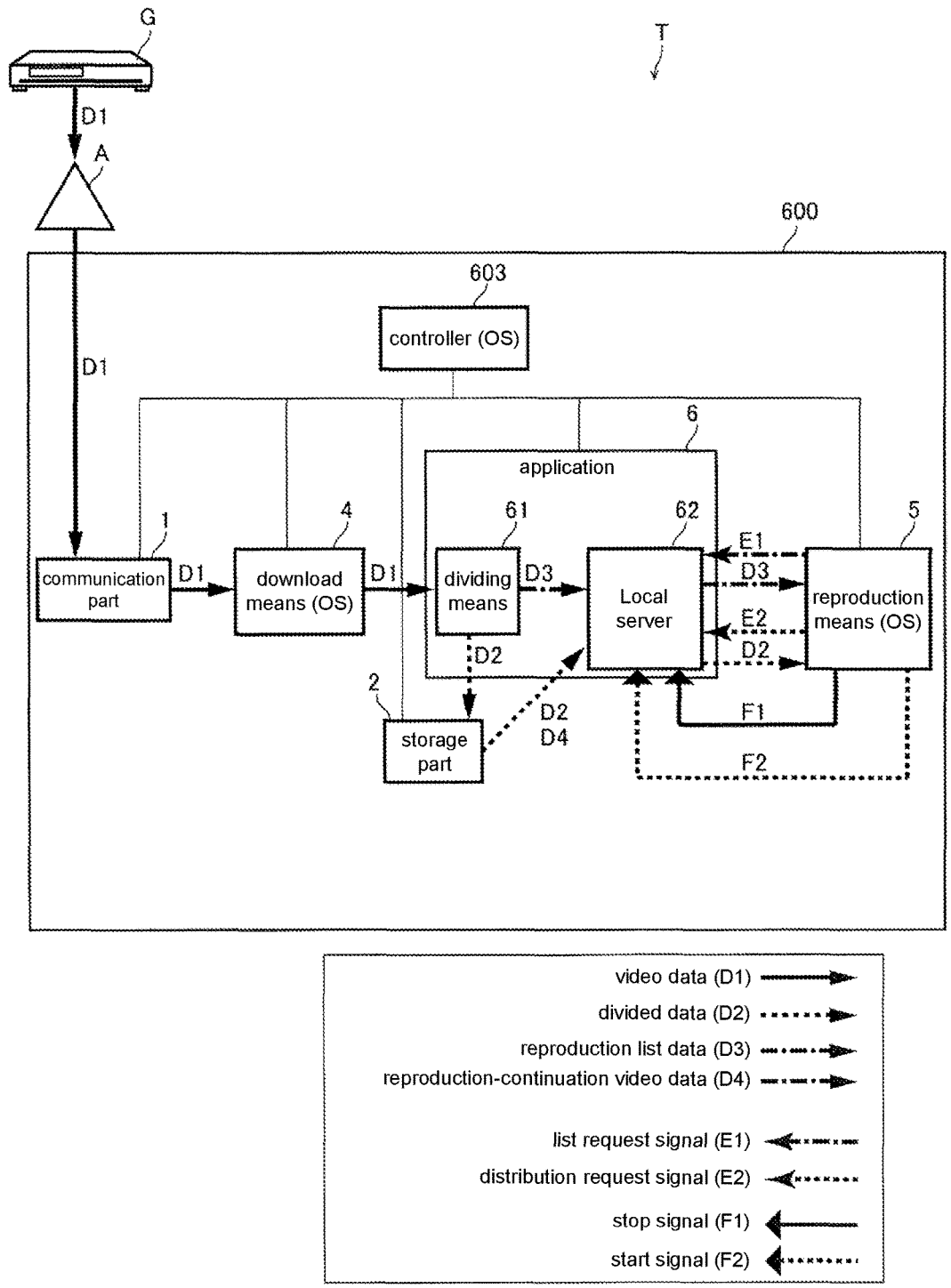
FIG. 11 is a block diagram illustrating an entire configuration of a communication network system including an information device according to a sixth embodiment of the present disclosure.

As illustrated in FIG. 11, an information device 600 according to the sixth embodiment includes a controller 603.

Figure 12:
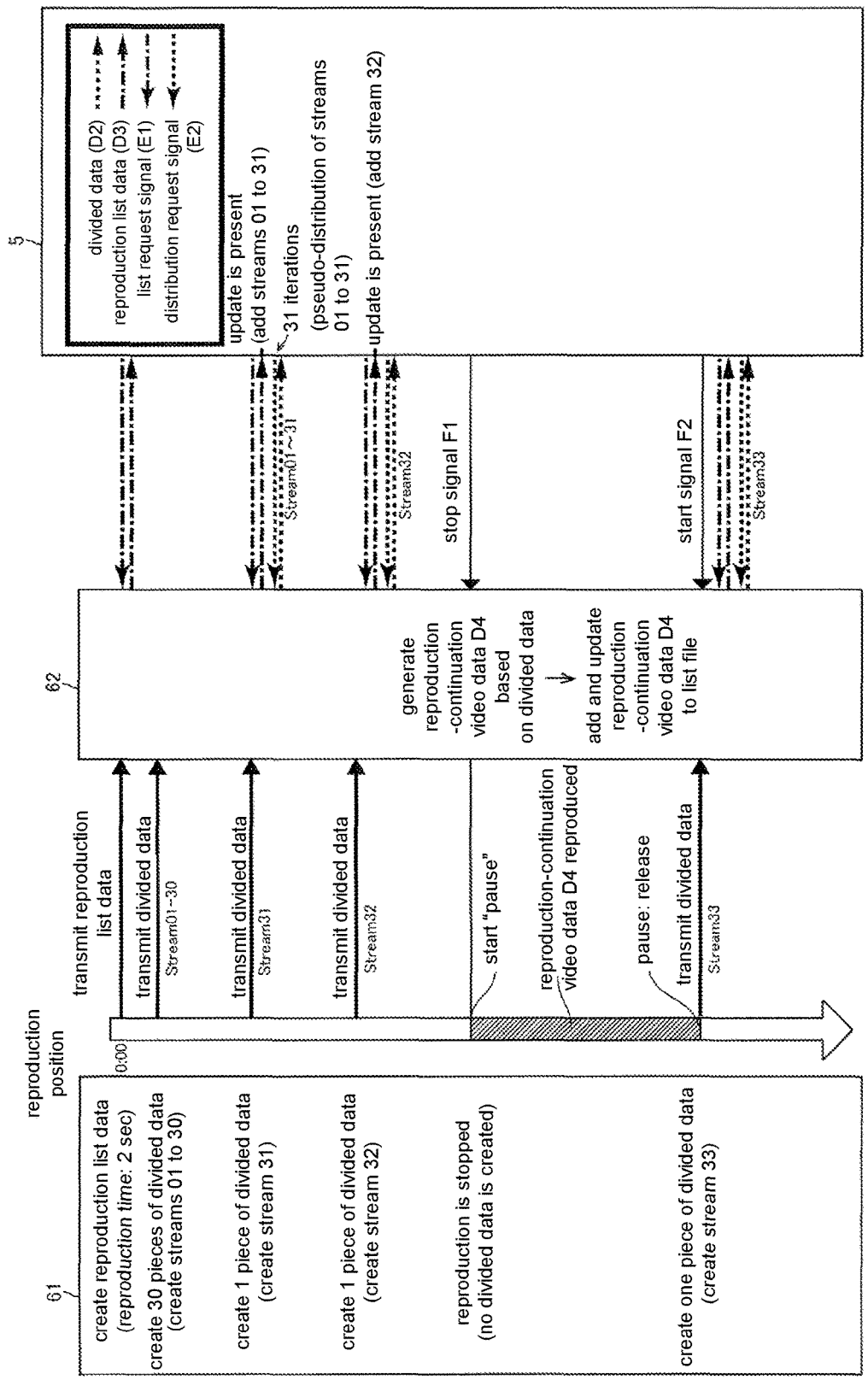
FIG. 12 is a sequence chart illustrating a video reproduction process by a controller of the information device according to the sixth embodiment of the present disclosure.

As illustrated in FIG. 12, if a local server 62 receives a stop signal F1 for stopping the reproduction of the divided data D2, the controller 603 (see FIG. 11) performs control for updating the reproduction list data D3 based on the reproduction-continuation video data D4 to start the reproduction (pseudo-stop) of the reproduction-continuation video data D4. Also, if the local server 62 receives the stop signal F1, the controller 603 performs control for creating the reproduction-continuation video data D4 based on the divided data D2.

As a specific example, if the local server 62 receives the stop signal F1 from the reproduction means 5 based on the that the user performs a stop operation in an operation part (not illustrated) during the reproduction of the movie serving as divided data D2, the controller 603 (see FIG. 11) creates the reproduction-continuation video data D4 (see FIG. 12) that scenes (images) of a movie at a time point (moment) when a stop operation is performed are continuously displayed. Because the images to be continuously displayed are images at the time point (moment) when the stop operation is performed, the images are recognized as still images by the user. The controller 603 updates the reproduction list data D3 based on the created reproduction-continuation video data D4 and then starts to reproduce (pseudo-stop) the reproduction-continuation video data D4. Also, the created reproduction-continuation video data D4 is stored in the storage part 2.

Also, if the local server 62 receives a start signal F2 for starting to reproduce the divided data D2 during reproduction of the reproduction-continuation video data D4, the controller 603 performs control for updating reproduction list data D3 based on the divided data D2 to reproduce the divided data D2.

That is, by the stop signal F1, the controller 603 performs control for stopping reproduction based on the divided data D2 and starting to perform pseudo-reproduction based on the reproduction-continuation video data D4. Thereafter, by the start signal F2, the controller 603 performs control for stopping reproduction based on the reproduction-continuation video data D4 and starting reproduction based on the divided data D2.

Also, other components of the sixth embodiment are similar to those of the above first embodiment.

Effects of Sixth Embodiment

In the sixth embodiment, the following effects can be obtained.

In the sixth embodiment, as described above, the controller 603, which performs control for downloading video data D1 from the external device G via the communication part 1 capable of communicating with the external device G and control for executing the application 6 for creating the divided data D2 having the same format (a transport stream format or the like) as the video data D1 from the downloaded video data D1, is provided. By the controller 603, the local server 62, which transmits the divided data D2 to the reproduction means 5, is configured within the application 6. Thereby, because the transmission (streaming) of the video from the local server 62 is performed on the application 6 in a pseudo manner by creating the divided data D2 having the same format from the video data D1 having the transport stream format downloaded by the communication part 1, the information device 600 can perform streaming reproduction without converting the downloaded video data D1 according to the transport stream format into another format.

Also, the controller 603 is configured to perform control for updating the reproduction list data D3 by adding the reproduction-continuation video data separate from the divided data D2 to the reproduction list data D3 until the reproduction list data D3 is updated based on the divided data D2. Thereby, even when the reproduction list data D3 is not updated based on the divided data D2 due to an unstable communication state or the like, it is possible to continue reproduction of another video by updating list data based on the reproduction-continuation video data. Thus, because the reproduction of the video based on the same format (a reproduction formation based on the list data) is continued, it is possible to prevent the reproduction of the video from being terminated (a state in which reproduction cannot be continued from the same position).

Also, in the sixth embodiment as described above, the controller 603 is configured to perform control for updating the reproduction list data D3 based on the reproduction-continuation video data D4 to start to reproduce the reproduction-continuation video data D4 when the local server 62 receives a stop signal F1 for stopping the reproduction of the divided data D2. Thereby, it is possible to prevent reproduction of a video from being terminated because the reproduction of the video based on the same format (a reproduction format based on list data) is continued based on the stop signal F1 even when the user has performed a reproduction stop operation (PAUSE operation).

Also, in the sixth embodiment as described above, the controller 603 is configured to perform control for updating the reproduction list data D3 based on the divided data D2 to reproduce the divided data D2 when the local server 62 receives the start signal F2 for starting to reproduce the divided data D2 during the reproduction of the reproduction-continuation video data D4. Thereby, it is possible to quickly reproduce the divided data D2 because a video of the same format is not terminated even when video reproduction is performed again after the reproduction of the video is temporarily stopped. Also, it is possible to resume the reproduction for the divided data D2 based on the start signal F2 even when the reproduction of the reproduction-continuation video data D4 is not performed.

Also, in the sixth embodiment, as described above, the controller 603 is configured to perform control for creating the reproduction-continuation video data D4 the based on the divided data D2 when the local server 62 receives the stop signal F1. Thereby, it is possible to allow the user to feel that a normal stop operation is performed on the divided data D2 even when the reproduction continuation video data D4 separate from the divided data D2 is reproduced because a video based on the divided data D2 (including a video in which an image does not visually change) is reproduced even when the reproduction of the divided data D2 is stopped.

Also, other effects of the sixth embodiment are similar to those of the above-described first embodiment.

Modified Examples

The embodiments disclosed herein are mere examples in all aspects and should not be understood as limiting the disclosure. The scope of the present disclosure is defined by the claims, not by the aforementioned description, and can also include all changes (modified examples) having equivalent meanings to those of the claims and falling within the claims.

For example, while various aspects of the present disclosure have been shown in the above described first to fifth embodiments, the present disclosure is not limited to the aspects of the embodiments. The present disclosure also includes an aspect in which one or more components of each embodiment and a component of another embodiment are appropriately combined.

Also, although a process operation of the controller has been described using a flow-driven flowchart in which the process is sequentially performed along a process flow for convenience of description in the above second embodiment, the present disclosure is not limited thereto. In the present disclosure, the process operation of the controller may be performed according to an event-driven process of executing processes in units of events. In this case, the process operation of the controller may be performed in a full event-driven type or may be performed by combining the event-driven process and the flow-driven process.

Also, although an example in which the two local servers are always configured within the application has been shown in the above third embodiment, the present disclosure is not limited thereto. In the present disclosure, one local server may be configured within the application and two local servers may be configured within the application only in predetermined cases such as a case in which the reproduction of a video is stopped.

Figure 13:
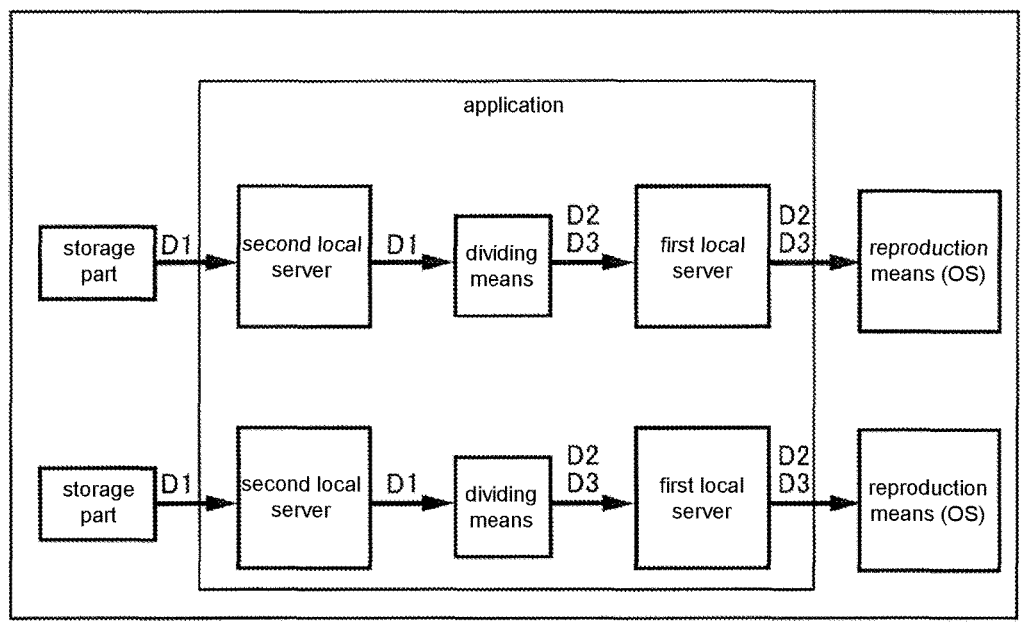
FIG. 13 is a block diagram illustrating a simplified configuration of an information device according to a modified example of the fourth embodiment of the present disclosure.

Also, although an example of a configuration in which video data is branched from one second local server to two local servers and transmitted so that two videos can be viewed has been shown in the above fourth embodiment, the present disclosure is not limited thereto. In the present disclosure, as in the modified example illustrated in FIG. 13, the configuration as described in the third embodiment may be provided in parallel so that two videos can be viewed.

Also, although an example in which the reproduction-continuation video data of the present disclosure is created and the created reproduction-continuation video data is reproduced at the time of a reproduction stop operation by the user (a PAUSE operation time) is shown in the above sixth embodiment, the present disclosure is not limited thereto. In the present disclosure, the reproduction-continuation video data according to the present disclosure may be previously created and stored in the storage part and the created reproduction-continuation video data stored in the storage part may be reproduced at the time of the reproduction stop operation by the user (the PAUSE operation time).

In this case, the video data for the reproduction continuation may be, for example, video data with a single color (black or the like) or a promotional video (CM) acquired via the Internet or the like.

What is claimed is:

1. An information device, comprising:
   a communication part, communicating with an external device;
   a reproduction part; and
   a controller, performing control for downloading video data from the external device via the communication part and performing control for executing an application, wherein the application is to create distribution data by dividing the video data in data units, the distribution data having the same format as the video data from the video data and reproduction list data indicating an arrangement position of the distribution data, and to reproduce the distribution data,
   wherein the controller forms and controls the executing of a local server in the application for transmitting the distribution data and the reproduction list data to the reproduction part, and
   performs control for putting a transmission of the reproduction list data from the local server to the reproduction part on standby until the reproduction list data is updated based on the distribution data, or
   performs control for adding reproduction-continuation video data separate from the distribution data to update the reproduction list data until the reproduction list data is updated based on the distribution data,
   wherein the reproduction list data is updated if the local server receives a stop signal from reproduction part and wherein when the local server receives the stop signal for stopping the reproduction of the distribution data, the controller is configured to perform control for updating the reproduction list data based on the reproduction-continuation video data to start to reproduce the reproduction-continuation video data.

2. The information device according to claim 1, wherein a list request signal for requesting a transmission of the reproduction list data is repeatedly transmitted from the reproduction part to the local server at a first time interval, and
   the controller performs control for putting the transmission of the reproduction list data from the local server to the reproduction part on standby even when the local server receives the list request signal from the reproduction part.

3. The information device according to claim 2, wherein if download of the video data is stopped, the controller performs control for putting the transmission of the reproduction list data from the local server to the reproduction part on standby when the local server receives the list request signal from the reproduction part.

4. The information device according to claim 3, wherein the controller performs control for transmitting the reproduction list data from the local server to the reproduction part in response to that the reproduction list data is updated after the stop of the download of the video data is released.

5. The information device according to claim 4, wherein when the reproduction part receives the updated reproduction list data, a distribution request signal for requesting the transmission of the distribution data is transmitted from the reproduction part to the local server based on the updated reproduction list data, and
   the controller performs control for transmitting the distribution data from the local server to the reproduction part when the distribution request signal is received.

6. The information device according to claim 1, wherein the controller periodically creates the distribution data and updates the reproduction list data at a second time interval.

7. The information device according to claim 6, wherein the distribution data is divided into two or more in correspondence with a predetermined reproduction time in the application which is a time interval required to reproduce one piece of the divided data, and the second time interval is the same as the reproduction time.

8. The information device according to claim 1, wherein the application further comprises a dividing part, and the dividing part divides the downloaded video data into two or more within the application to generate the distribution data; and
   the local server in the application comprises a first local server, transmitting the distribution data and the reproduction list data to the reproduction part, and a second local server, transmitting the video data to the dividing part.

9. The information device according to claim 8, wherein the local server further comprises a third local server, transmitting the distribution data and the reproduction list data to the reproduction part.

10. The information device according to claim 1, wherein the controller creates a thumbnail image based on the distribution data while the reproduction part reproduces the video data.

11. The information device according to claim 10, wherein the local server comprises a fourth local server, creating the thumbnail image.

12. The information device according to claim 1, wherein when the local server receives a start signal for starting to reproduce the distribution data during the reproduction of the reproduction-continuation video data, the controller performs control for updating the reproduction list data based on the distribution data to reproduce the distribution data.

13. The information device according to claim 1, wherein the controller performs control for creating the reproduction-continuation video data based on the distribution data when the local server receives the stop signal.

14. The information device according to claim 13, wherein the reproduction-continuation video data is a still image, captured from the distribution data at a time point when the local server receives the stop signal.

15. The information device according to claim 1, further comprising:
a storage part, storing the reproduction-continuation video data,
wherein the controller performs control for reproducing the reproduction-continuation video data stored in the storage part when the local server receives the stop signal.

16. The information device according to claim 1, wherein the reproduction-continuation video data is video data with single color.

17. The information device according to claim 1, wherein the controller performs control for acquiring the reproduction-continuation video data from the external device via the communication part.

* * * * *